United States Patent
Watanabe et al.

(10) Patent No.: US 8,797,394 B2
(45) Date of Patent: Aug. 5, 2014

(54) FACE IMAGE CAPTURING APPARATUS

(75) Inventors: Taito Watanabe, Obu (JP); Takuhiro Omi, Anjo (JP)

(73) Assignee: Denso Corporation, Kariya (JP)

(*) Notice: Subject to any disclaimer, the term of this patent is extended or adjusted under 35 U.S.C. 154(b) by 221 days.

(21) Appl. No.: 13/585,260

(22) Filed: Aug. 14, 2012

(65) Prior Publication Data

US 2013/0050462 A1 Feb. 28, 2013

(30) Foreign Application Priority Data

Aug. 25, 2011 (JP) .................................. 2011-183260

(51) Int. Cl.
| H04N 7/18 | (2006.01) |
| G03B 15/02 | (2006.01) |
| B60R 21/015 | (2006.01) |
| H04N 5/232 | (2006.01) |
| G06K 9/00 | (2006.01) |

(52) U.S. Cl.
CPC ....... *G03B 15/02* (2013.01); *B60R 2021/01566* (2013.01); *H04N 5/23219* (2013.01); *G06K 9/00248* (2013.01)
USPC .............................................. 348/77; 701/36

(58) Field of Classification Search
CPC combination set(s) only.
See application file for complete search history.

(56) References Cited

U.S. PATENT DOCUMENTS

| 5,801,763 | A | 9/1998 | Suzuki |
| 6,812,855 | B1 | 11/2004 | Sudou et al. |
| 7,466,847 | B2 * | 12/2008 | Komura ........................ 382/118 |
| 8,368,758 | B2 * | 2/2013 | Fujimoto et al. .............. 348/164 |
| 2005/0226472 | A1 | 10/2005 | Komura |
| 2005/0270413 | A1 * | 12/2005 | Hatano et al. ................. 348/370 |
| 2006/0018641 | A1 | 1/2006 | Goto et al. |
| 2008/0186701 | A1 * | 8/2008 | Omi .............................. 362/231 |
| 2009/0244288 | A1 | 10/2009 | Fujimoto et al. |

FOREIGN PATENT DOCUMENTS

| JP | 3-62396 | 6/1991 |
| JP | 7-006893 | 1/1995 |
| JP | 8-159733 | 6/1996 |
| JP | 11-327508 | 11/1999 |
| JP | 2001-308384 | 11/2001 |
| JP | 2002-143087 | 5/2002 |

(Continued)

OTHER PUBLICATIONS

Office Action dated Jun. 27, 2013 in corresponding Korean Application No. 10-2012-92722.

(Continued)

*Primary Examiner* — Dave Czekaj
*Assistant Examiner* — Tyler W Sullivan
(74) *Attorney, Agent, or Firm* — Harness, Dickey & Pierce, PLC

(57) ABSTRACT

An in-vehicle face image detection apparatus operates as follows. A projector projects light. A capture controller settles a capturing condition to capture a predetermined region including a face of an occupant. A capturing portion captures the predetermined region based on the capturing condition. An environment light detection portion detects environment light radiated to the vehicle or occupant. An operation mode determination portion determines a first mode where intensity of the environment light is greater than a threshold or a second mode where the intensity is not greater than the threshold. A light emission pattern setup portion settles a light emission pattern for a light source of the projector based on the operation mode. A projector controller controls the projector to activate the light source based on the light emission pattern.

11 Claims, 8 Drawing Sheets

(56) References Cited

FOREIGN PATENT DOCUMENTS

| | | |
|---|---|---|
| JP | 2005-079683 | 3/2005 |
| JP | 2005-242428 | 9/2005 |
| JP | 2005-301742 | 10/2005 |
| JP | 2006-025140 | 1/2006 |
| JP | 2009-246903 | 10/2009 |
| JP | 2010-176382 | 8/2010 |

OTHER PUBLICATIONS

Stanley Electric Co., Ltd. Surface Mount IRED/Flat Lens Type, p. 9, Jun. 30, 2010.

Osram Opto Semiconductors, SFH 4235, p. 5, Mar. 27, 2012.

Office Action issued Jun. 17, 2013 in corresponding Japanese Application No. 2011-183260 (with English translation).

* cited by examiner

FIG. 6

CAMERA CONTROLS

TABLE 1

| dB | SHUTTER TIME | GAIN |
|---|---|---|
| -2 | 100 μsec | x1 |
| -1 | 200 μsec | x1 |
| 0 | 300 μsec | x2 |
| 1 | 400 μsec | x3 |
| 2 | 500 μsec | x4 |
| 3 | 600 μsec | x5 |
| ⋮ | ⋮ | ⋮ |
| 20 | 1000 μsec | x10 |
| 25 | 800 μsec | x15 |
| 17 | 2000 μsec | x17 |

TABLE 2

TABLE 3

FIG. 8  RELATED ART
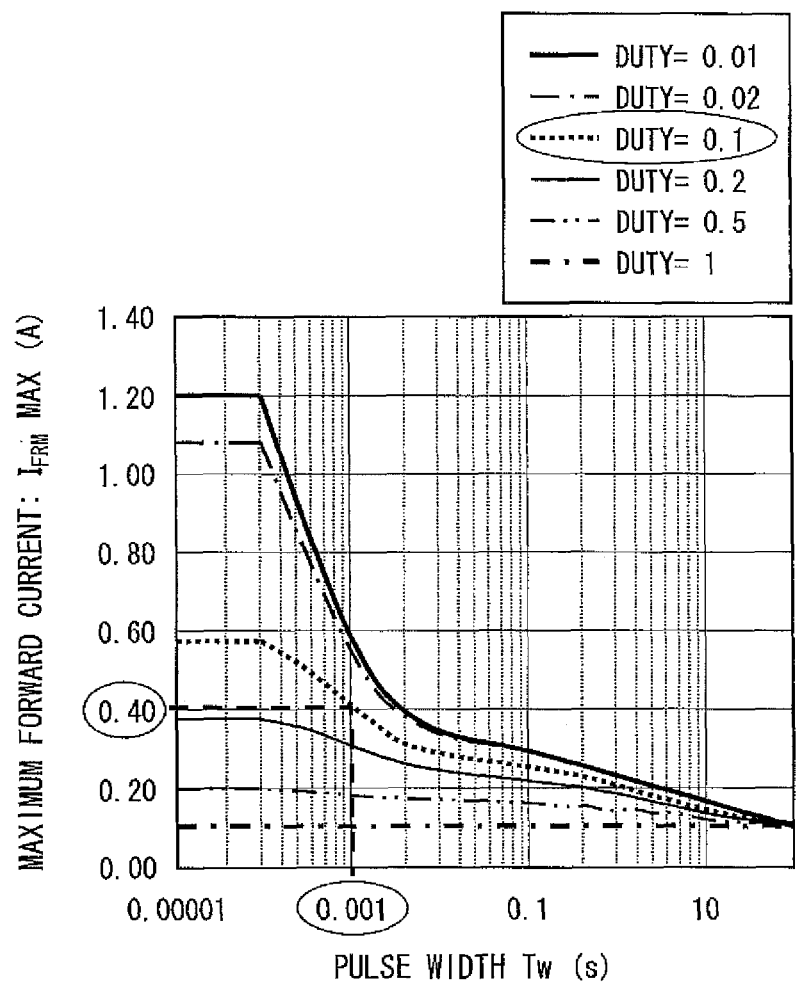
PULSE WIDTH VS. MAXIMUM FORWARD CURRENT
CONDITION: Ta≤60°C
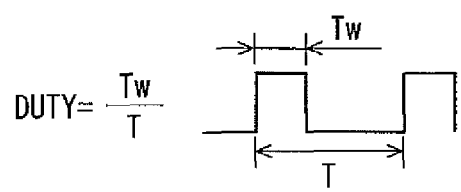

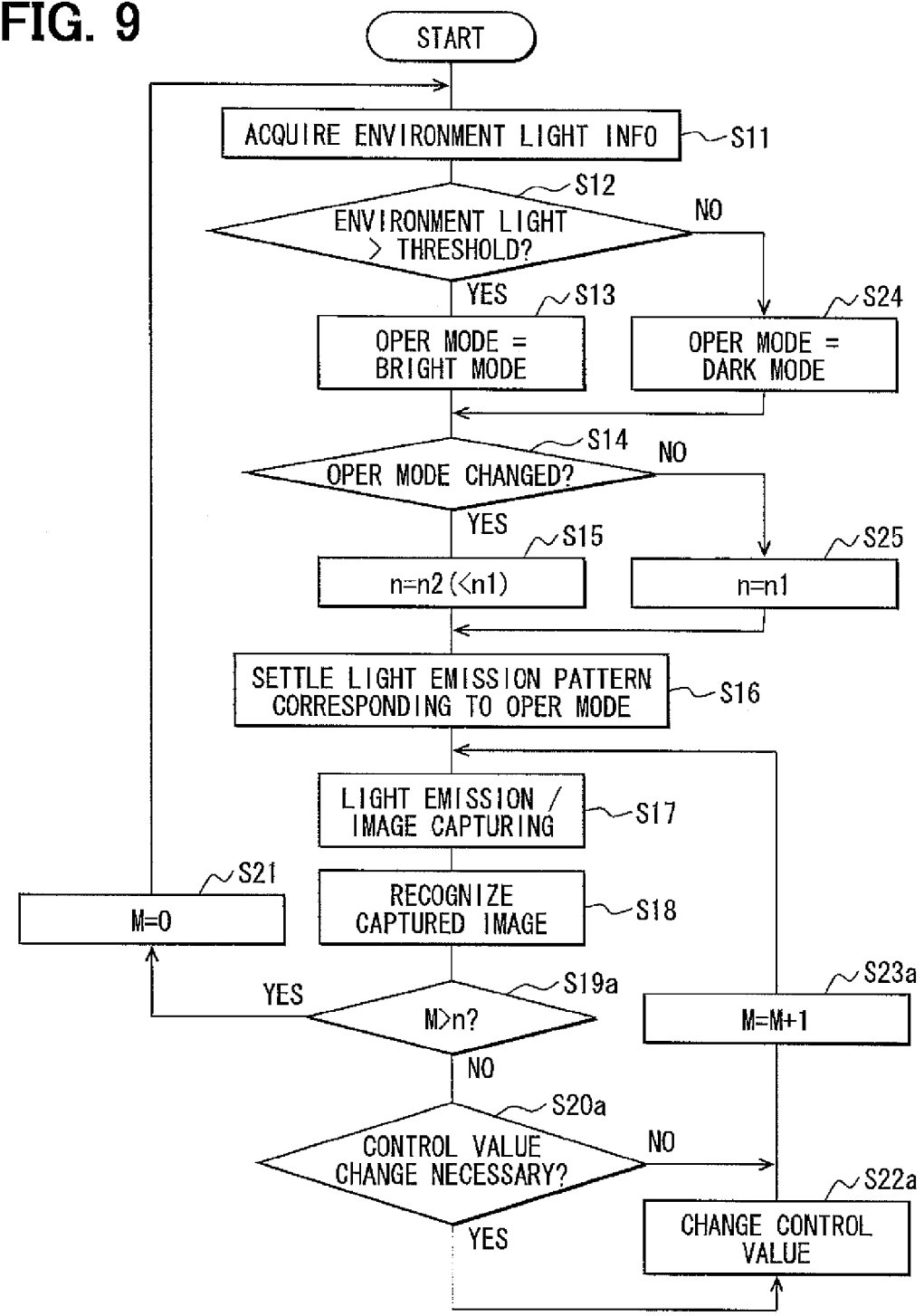

FACE IMAGE CAPTURING APPARATUS

CROSS REFERENCE TO RELATED APPLICATION

This application is based on Japanese Patent Application No. 2011-183260 filed on Aug. 25, 2011, the disclosure of which is incorporated herein by reference.

TECHNICAL FIELD

The present disclosure relates to a face image detection apparatus that detects a human face image in a captured image.

BACKGROUND

Patent document 1: JP H08-159733 A
Patent document 2: JP H09-021611 A (U.S. Pat. No. 5,801,763)
Patent document 3: JP 2005-301742 A (US 2005/0226472)
Patent document 4: JP 2005-354155 A (US 2005/0270413)
Patent document 5: JP 2010-176382 A According to a disclosed driver state detection apparatus, a camera provided in a vehicle compartment captures a driver's face. The apparatus processes the captured face image and extracts facial feature points such as an eye, nose, and mouth. Based on feature point positions or an opened or closed state of the eyes, the apparatus detects driving states such as the driver's facial orientation and drowsy driving. The driver state detection apparatus uses an infrared strobe light or LED to illuminate and capture the driver's face. The infrared strobe light or LED has a near-infrared wavelength and is provided near the camera.

Positions of a retina reflection image and a cornea reflection image in an eyeball can be acquired as image information to measure reflection images from the vehicle driver's eyeball. The pupil contracts under intense outside light such as the sunlight and decreases the light intensity that reaches the retina through the pupil. This makes it difficult to acquire a reflection image from the retina and degrades the measurement accuracy in an eye direction. The vehicular eye direction measurement apparatus disclosed in patent document 1 decreases a noise due to the outside light by accelerating the shutter speed and increasing the peak power of illumination light. The apparatus can accurately extract a reflection image without increasing the measurement time.

According to the face image capturing apparatus disclosed in patent document 2, the eye detection means detects a test subject's eye based on the test subject's face image captured by the two-dimensional capturing means. If the eye detection means does not detect the test subject's eye, the infrared illuminating means is activated to capture the driver's face image. Even if the driver wears his or her glasses, the infrared illuminating means can minimize an effect of the light reflected in the lens surface of glasses. The infrared illuminating means illuminates at least the test subject's face with infrared light passing through an optical filter. The infrared illuminating means is provided so that the optical axis of the two-dimensional capturing means and the optical axis of the infrared light form an angle larger than or equal to the predetermined angle.

The driver appearance recognition system disclosed in patent document 3 can extend service life of the infrared illuminating means. For this purpose, various appearance recognition processes change the illuminance of a face image captured by the camera to necessary illuminance.

The motion picture capturing apparatus disclosed in patent document 4 can adaptively adjust the amount of luminescence of a lighting apparatus under a low-illuminance environment in accordance with changes in the brightness of an object.

The lighting apparatus disclosed in patent document 5 frees a driver from a feeling of strangeness. The vehicle may operate its illumination portion and stops its engine. In this case, the lighting apparatus adjusts the irradiating light intensity mainly based on the environment light illumination detected by the environment light detection portion. The vehicle may operate its illumination portion and its engine. In this case, the lighting apparatus adjusts the irradiating light intensity mainly based on a recognition result notified from the recognition portion.

As described in patent document 1, for example, feature points on the driver's face may be detected under such intense outside light as to reflect the surrounding landscape in driver's glasses. In such a case, the illumination is preferably more intense than the sunlight. For example, the light source such as an LED may be activated in pulses synchronously with the image capturing timing. This can radiate the light more intensely than steady lighting. In terms of the LED light source wavelength, the invisible near-infrared light is generally used in order to protect the driver against unpleasant feeling or prevent driving troubles in the night. It is practical to select a low-wavelength LED from the near-infrared light in order to ensure the sensitivity of an image capturing system. Generally, such an LED contains visible components that may be perceived to be red depending on the driver's visual feature. The driver may feel a perceptible flicker especially in the night or darkness depending on the image capturing timing.

Steadily activating the illumination can prevent a flicker. However, the rated LED current magnitude generates weak emission intensity and is too small to prevent the glasses from reflecting the landscape. For example, many LEDs may be provided in array to ensure the sufficient emission intensity. However, this increases costs.

The technologies disclosed in patent documents 2 through 5 adjust the emission intensity (light intensity) of the irradiating light (LED) in accordance with the detected eye state, the occupant appearance recognition process, the object brightness, or operational situations of the illumination portion and the engine. However, patent documents 2 through 5 do not disclose or suggest considerations on the visual sense such as flicker prevention or emission intensity adjustment.

SUMMARY

The present disclosure has been made in consideration of the foregoing. It is therefore an object of the present disclosure to provide a face image detection apparatus capable of suppressing a flicker of light radiated to an occupant's face and reducing reflection of surrounding landscape in the driver's glasses.

To achieve the above object, according to a first aspect of the present disclosure, a face image detection apparatus is provided as follows. A projector is included to project light onto a projection region including a face of an occupant in a vehicle. An image capture controller is included to settle an image capturing condition to capture a predetermined capture region that includes the face of the occupant. An image capturing portion is included to perform image capturing to capture the predetermined capture region including the face based on the image capturing condition settled by the image capture controller. An environment light detection portion is included to detect environment light radiated to one of the vehicle and the occupant. An operation mode determination portion is included to perform a mode determination to determine an operation mode out of at least two operation modes, one of the two operation modes being a first mode where a light intensity of the environment light detected by the environment light detection portion is greater than a predetermined light intensity threshold, an other of the two operation modes being a second mode where the light intensity of the environment light detected by the environment light detection portion is not greater than the predetermined light intensity threshold. A light emission pattern setup portion is included to settle a light emission pattern for a light source of the projector based on the operation mode determined by the operation mode determination portion. A projector controller is included to control the projector to activate the light source based on the light emission pattern settled by the light emission pattern setup portion.

According to the above configuration, an operation mode is determined in accordance with an environment light situation. A light emission pattern for a projector is settled based on the operation mode. This control can allow a driver to hardly perceive flicker of the projector as a light source. The above-mentioned configuration can reduce an illumination flicker under the high-intensity environment light by setting a light emission pattern so as to relatively increase the projector light intensity. This can also reduce reflection of the landscape in the glasses without making a driver perceive a flicker in the daytime when the landscape often reflects in the glasses. On the other hand, the low-intensity environment light causes a small effect of reflecting the landscape in the glasses. The projector light intensity can be reduced to extend the light emission time. The light emission pattern can be configured to decrease the light emission cycle so that no flicker is perceivable. As a result, an illumination flicker can be reduced. The necessary light intensity (emission intensity) can be ensured without providing the projector with many LEDs in array.

BRIEF DESCRIPTION OF THE DRAWINGS

The above and other objects, features, and advantages of the present disclosure will become more apparent from the following detailed description made with reference to the accompanying drawings. In the drawings:

FIG. 6 is diagram illustrating examples of camera controls;

FIG. 8 is a diagram illustrating a relationship between a pulse width and a maximum forward current to drive an LED in pulses, prepared based on related art data; and FIG. 9 is a flowchart diagram illustrating another projector control process according to the embodiment.

DETAILED DESCRIPTION

Figure 1:
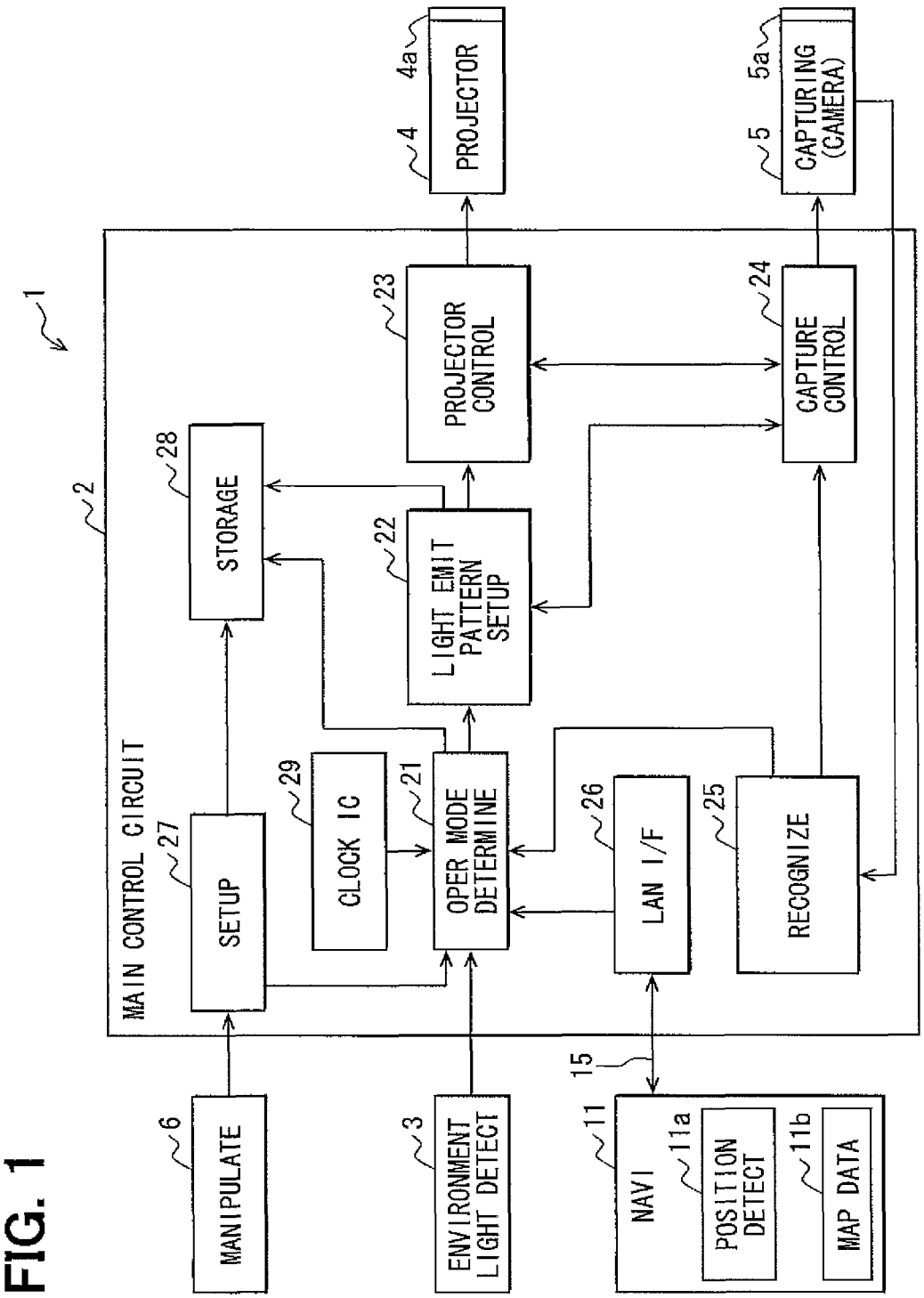
FIG. 1 is a block diagram showing a configuration of the face image detection apparatus according to an embodiment of the present disclosure.

A face image detection apparatus according to an embodiment of the present disclosure will be described with reference to the accompanying drawings. FIG. 1 shows a configuration of a face image detection apparatus 1 in a vehicle, according to the embodiment. The face image detection apparatus 1 includes a main control circuit 2 connecting with an environment light detection portion 3, a projector 4, an image capturing portion 5, and a manipulation portion 6. The face image detection apparatus 1 may communicably connect with a navigation apparatus 11 through a local area network (LAN) 15.

The main control circuit 2 is configured as computer hardware including a CPU, ROM, RAM, and peripheral circuits such as an AD converter circuit and an input/output circuit according to known technologies. The CPU executes a control program and data stored in the ROM to provide various functions of the face image detection apparatus 1. The main control circuit 2 includes an operation mode determination portion 21, a light emission pattern setup portion 22, a projector controller 23, an image capture controller 24, a recognition portion 25, a setup portion 27, and a storage portion 28. These portions are represented as function blocks equivalent to the above-mentioned computer hardware.

The operation mode determination portion 21 determines an operation mode based on information acquired from an outside source and outputs a result. The light emission pattern setup portion 22 settles a light emission pattern for the projector 4 corresponding to the operation mode. The projector controller 23 receives output from the light emission pattern setup portion 22 and activates or inactivates a light source 4a of the projector 4 based on the settled light emission pattern. The image capture controller 24 receives output from the projector controller 23 or the light emission pattern setup portion 22 and controls operation of the image capturing portion 5 such as opening or closing a shutter 5a. For instance, the image capture controller 24 also settles an image capturing condition such as exposure time, gain, and γ curve of an image capturing element. The recognition portion 25 includes a known image processing circuit. The recognition portion 25 amplifies image data captured by the image capturing portion 5 to a state capable of image processing. The recognition portion 25 extracts an occupant's face image using a general digitization process or feature point extraction process. Based on an extraction result, the recognition portion 25 determines whether the occupant face is recognized.

The setup portion 27 configures settings concerning operation of the face image detection apparatus 1 based on manipulation of the manipulation portion 6 (to be described). The storage portion 28 includes a known nonvolatile storage medium such as flash memory. The storage portion 28 stores data such as the contents of the setup portion 27 or camera controls (also referred to as camera control table) (see FIG. 6) needed for operation of the face image detection apparatus 1.

The main control circuit 2 may further include a clock IC 29 to output time and date information and a LAN interface 26 equivalent to a communication interface circuit connected with the LAN 15.

The environment light detection portion 3 detects light (environment light) radiated to a vehicle or an occupant of the vehicle. The environment light contains the sunlight or street light radiated to the vehicle or the occupant, and the light in the vehicle compartment emitted from other than the face image detection apparatus 1.

The environment light detection portion 3 uses an optical sensor or an illuminometer containing a known CdS cell. The vehicle may be provided with a vehicular air conditioner (not shown) that air-conditions a vehicle compartment. The vehicular air conditioner may include a known solar radiation sensor that detects the amount of solar radiation applied to the vehicle. The environment light detection portion 3 may use the solar radiation sensor.

The projector 4 includes a light source 4a such as an infrared LED that can radiate light containing a near-infrared wavelength in pulses. The projector controller 23 activates the light source 4a. The activated light source 4a radiates near-infrared light toward an occupant's face including its surroundings. The projector 4 is positioned so that an optical axis of the near-infrared light radiated from the light source 4a approximately coincides with an optical axis of the image capturing portion 5.

The image capturing portion 5 includes a known CCD or CMOS camera, for example. The image capturing portion 5 captures a predetermined area including the occupant's face. The image capturing portion 5 is provided with the shutter 5a that operates based on a predetermined timing and exposure time.

The manipulation portion 6 includes a key or a switch. For example, the manipulation portion 6 specifies an illuminance threshold (to be described later in detail) in accordance with user operation.

As widely known, the navigation apparatus 11 detects the current position using GPS (Global Positioning System) according as a vehicle travels. The navigation apparatus 11 displays the current position along with a road map on a display apparatus. The navigation apparatus 11 settles an appropriate route from the starting point to a destination. The navigation apparatus 11 provides the guidance using the display apparatus or an audio output apparatus. The navigation apparatus 11 includes a position detection portion 11a and map data 11b.

Figure 7:
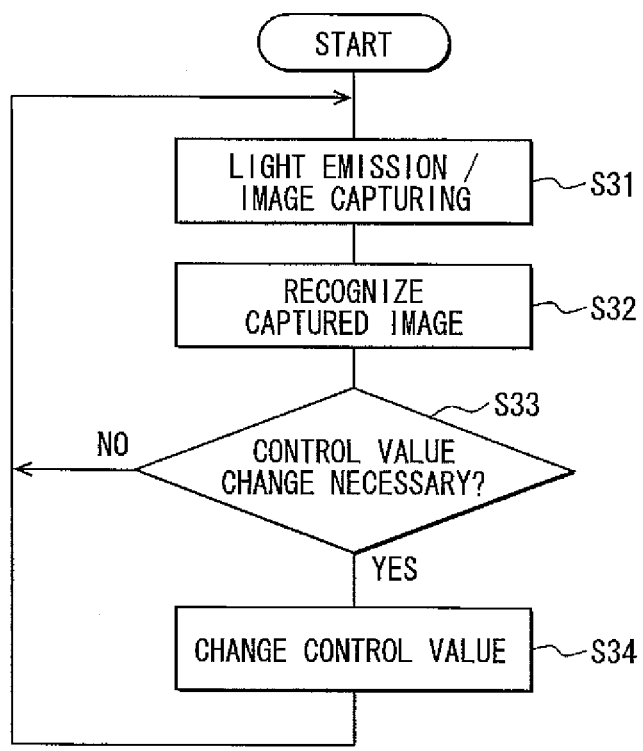
FIG. 7 is a flowchart diagram illustrating a projector control process according to related art.

With reference to FIG. 7, the following describes a projector control process according to a related art in comparison with the present disclosure.

It is noted that a flowchart or the processing of the flowchart in the present application includes sections (also referred to as steps), each of which is represented, for instance, as S11. Further, each section can be divided into several sub-sections while several sections can be combined into a single section. Further, each of thus configured sections can be also referred to as a portion, device, module, or means. Furthermore, each or any combination of sections explained in the above can be achieved as (i) a software section in combination with a hardware unit (e.g., computer) or (ii) a hardware section, including or not including a function of a related apparatus; furthermore, the hardware section may be constructed inside of a microcomputer.

Based on a control instruction from the projector controller 23, the projector 4 radiates pulsed near-infrared light at a constant frequency toward an occupant's face including its surroundings. Based on a control instruction from the image capture controller 24, the image capturing portion 5 captures a predetermined area including the occupant's face (S31). The recognition portion 25 recognizes the occupant's face from the captured image data (S32). Based on a recognition result, the recognition portion 25 may need to change a control value (YES at S33). In this case, the recognition portion 25 changes the control value (S34). For example, the control value represents the light intensity of the projector 4 or the shutter speed of the image capturing portion 5 (to be described later in detail). The process returns to S31 and radiates light and captures an image.

To improve the accuracy of recognizing the occupants face, the configuration shown in FIG. 7 just needs to do at least one of extending the time to radiate the near-infrared light, increasing the emission intensity (light intensity) of the near-infrared light, and extending the exposure time. For example, steady light emission extends the time (i.e., pulse width) to radiate the near-infrared light. This method can prevent an occurrence of flicker. In this regard, however, the rated LED current magnitude cannot provide sufficient emission intensity, as seen from FIG. 8 that is prepared based on conventional data. For instance, under Ambient temperature (Ta)≤60 degrees centigrade, Duty (TWIT)≤0.1, and Pulse width (Tw) ≤0.001 sec, Maximum forward current $I_{FRM}$ MAX can reach 0.4 A.

Figure 2:
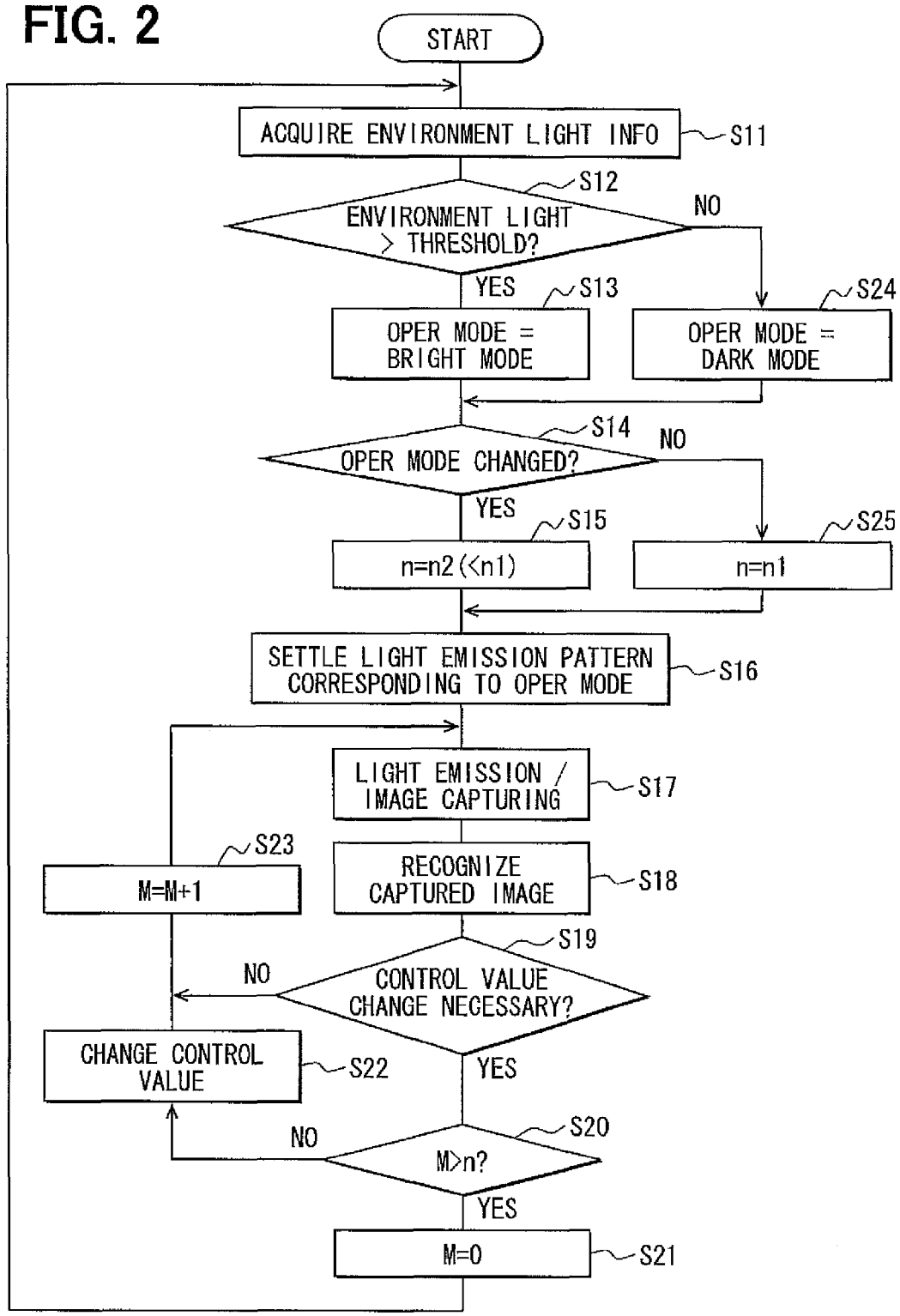
FIG. 2 is a flowchart diagram illustrating a projector control process according to the embodiment.

With reference to FIG. 2, the following describes a projector control process according to the present embodiment. This process is contained in the above-mentioned control program. The CPU of the main control circuit 2 repeatedly executes the projector control process as well as other processes.

The projector control process acquires environment light information (illuminance) using at least one of the following methods (S11).

The process acquires a value from an optical sensor or an illuminometer included in the environment light detection portion 3 and uses the acquired value as the environment light information.

The process converts the amount of solar radiation detected by the above-mentioned solar radiation sensor into the illuminance.

The process specifies periods of time such as morning, noon, evening, and night from the time-and-date information acquired from the clock IC 29 and estimates the illuminance based on the period of time.

The process estimates the illuminance from the state of a captured vehicular window such as the window brightness if the vehicular window is contained in an image captured by the image capturing portion 5.

The process detects the occupant's pupil diameter from an image captured by the image capturing portion 5 and estimates the illuminance from the pupil D diameter (the larger the pupil diameter, the lower the illuminance).

The process acquires the current position information from the navigation apparatus 11 and estimates the illuminance from the current position. For example, the illuminance decreases while the vehicle travels through a tunnel.

Figure 3:
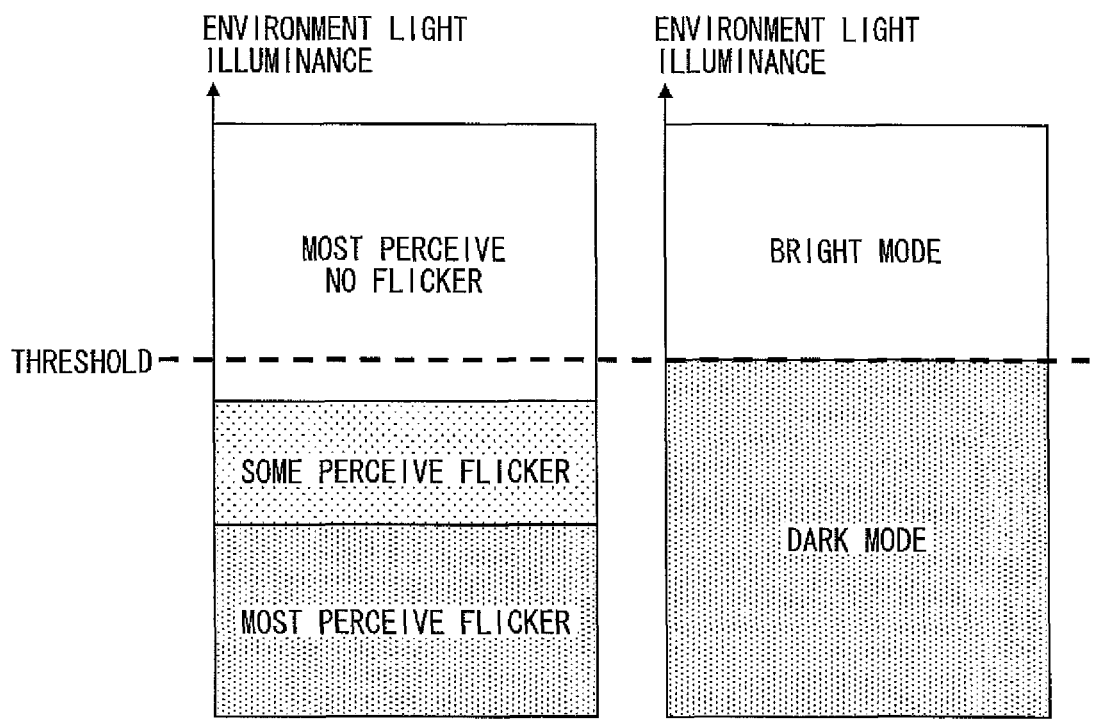
FIG. 3 is a diagram illustrating an example of illuminance threshold setting.

The operation mode determination portion 21 determines whether the acquired illuminance exceeds a predetermined illuminance threshold. FIG. 3 exemplifies illuminance threshold setting. First, three regions are designated in order of the environment light illuminance from higher to lower (see left side of FIG. 3). The highest is a region where mast people perceive no flicker. The second highest is a region where some individuals may perceive a flicker. The lowest is a region where most people may perceive a flicker. The illuminance threshold is set to be higher than an illuminance boundary between the highest region and the second highest region. Then, a bright mode and a dark mode are designated such that the boundary separates the bright mode and the dark mode from each other (see right side of FIG. 3). Thus, the operation mode determination portion 21 sets the operation mode to the bright mode (S13) if the acquired illuminance exceeds the illuminance threshold (YES at S12). The operation mode determination portion 21 sets the operation mode to the dark mode (S24) if the acquired illuminance is smaller the illuminance threshold (NO at S12).

The illuminance threshold may be variable because human sensitivity to the light varies between individuals. For this purpose, an occupant manipulates the manipulation portion 6 in accordance with a predetermined procedure. The setup portion 27 detects the manipulation and stores its content illuminance threshold) in the storage portion 28. The setup content is output to the operation mode determination portion 21.

The operation mode determination portion 21 determines whether the operation mode changes, that is, whether the determined operation mode is the same as that determined in the previous process. If the operation mode changes (YES at S14), the operation mode determination portion 21 sets a delay threshold n to n2 (S15). If the operation mode remains unchanged (NO at S14), the operation mode determination portion 21 sets the delay threshold n to n1 (S25). It is assumed that n1 and n2 are 0 or positive integers and n1 is greater than n2 (n1>n2).

The light emission pattern setup portion 22 settles a light emission pattern corresponding to the operation mode (S16).

Figure 4:
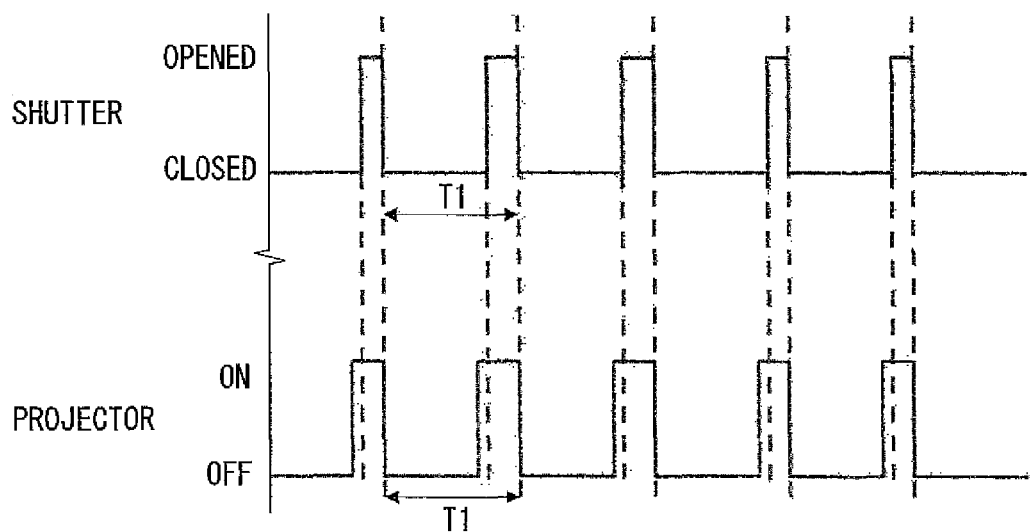
FIG. 4 is a diagram illustrating a relationship between a projection pattern of a projector and image capture timing of an image capturing portion.

With reference to FIG. 4, the following describes light emission patterns for the projector 4 and open/close control timing for the shutter 5a of the image capturing portion 5. According to the example of FIG. 4, the shutter 5a repeatedly opens and closes in cycles of T1 for exposure. The projector 4 emits light in pulses synchronously with the open/close timing (cycle T1) of the shutter 5a. The projector 4 starts emitting light (ON). The shutter 5a opens after a predetermined time elapses from the start of light emission. The shutter 5a closes after the exposure time expires. The projector 4 stops emitting light (OFF). The exposure time (time to open the shutter 5a) varies with capture objects (to be described in detail). The projector 4 may stop emitting light when a predetermined time elapses after the end of the exposure.

Obviously, image capturing of the image capturing portion 5 may be controlled with reference to the light emission timing of the projector 4.

Figure 5:
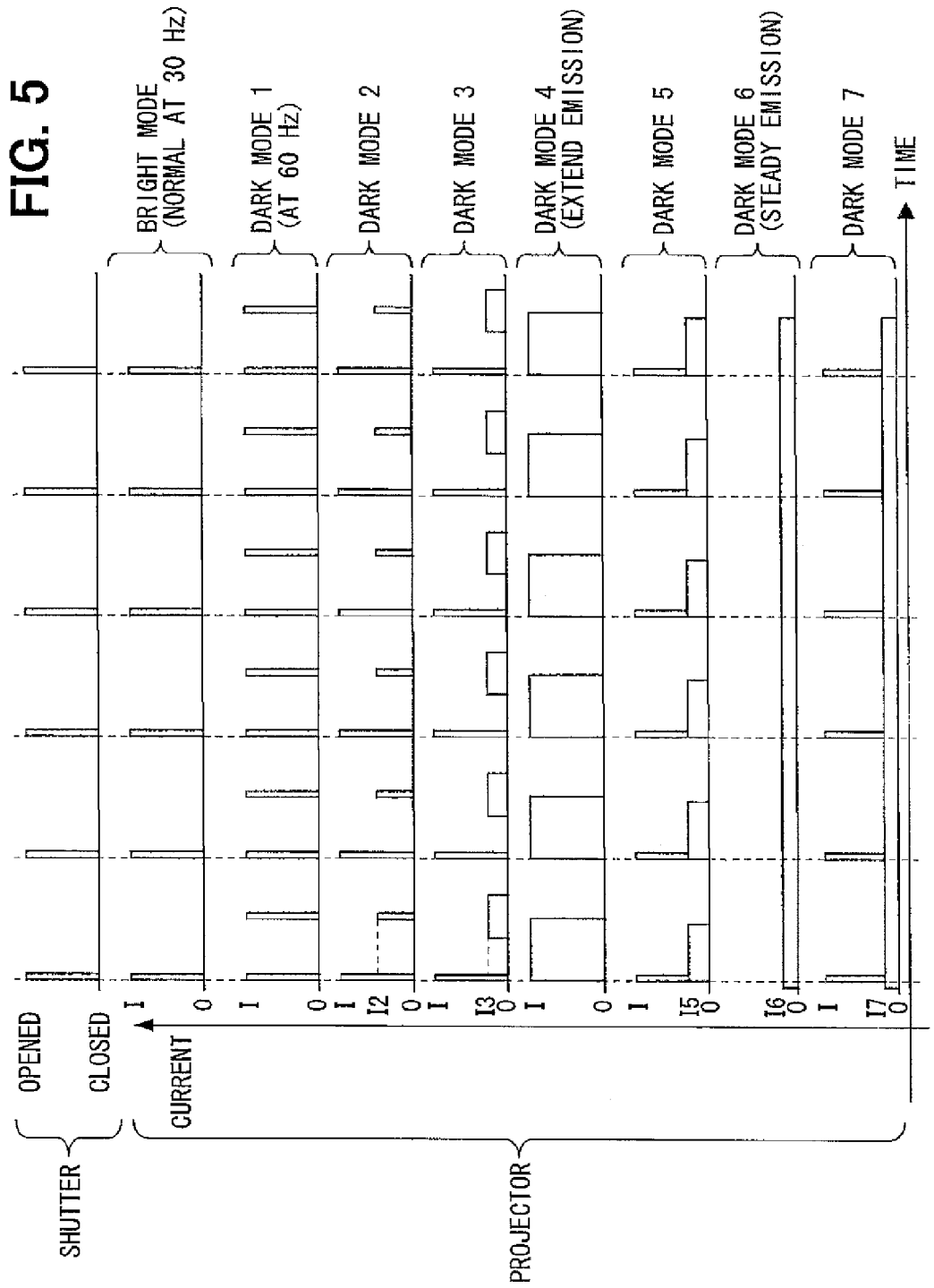
FIG. 5 is a diagram illustrating examples of projection patterns in operation modes.

With reference to FIG. 5, the following describes examples of light emission patterns for the projector 4 (or the light source 4a) in respective operation modes. The shutter 5a of the image capturing portion 5 repeats the exposure in 30 Hz cycles, for example. In the bright mode, the projector 4 is supplied with current synchronously with the exposure of the shutter 5a and emits the light (synchronous exposure-emission (also referred to as exposure-synchronous emission)). The light emission pattern causes pulse emission.

The pulse emission waveform may be saw-tooth, triangular, or sinusoidal as well as rectangular or square. Configurations of the projector controller 23 and the projector 4 determine the use of these waveforms.

An example in FIG. 5 shows light emission patterns corresponding to dark modes 1 through 7. One of these patterns is used. Obviously, it may be preferable to settle multiple illuminance thresholds to subdivide the dark mode region shown in FIG. 3 and apply one of seven light emission patterns to each of the subdivided regions. The following describes the light emission patterns corresponding to the dark modes.

In dark mode 1, the projector 4 repeats the light emission in 60 Hz cycles. That is, the projector 4 emits light in pulses at the timing (also referred to as a time interval) synchronous with the exposure of the shutter 5a (synchronous exposure-emission) and at the timing asynchronous with the exposure thereof (asynchronous exposure-emission (also referred to as exposure-asynchronous emission)). This can suppress an occurrence of flicker.

The above description uses the 60 Hz light emission cycle as a representative example. However, even the 60 Hz cycle may allow a flicker to be perceived depending on vehicle vibrations. In dark mode 1, a known vibration sensor (not shown) may be used to detect vibrations at locations in the vehicle. The light emission cycle for asynchronous exposure-emission may be varied in accordance with vibration frequencies. This configuration provides a vibration detection portion that detects vibrations in the vehicle. The light emission pattern setup portion settles a light emission pattern for asynchronous exposure-emission in accordance with the detected vibration frequency. A flicker is easily perceptible under the condition of high vibration frequencies. Therefore, the light emission frequency is accordingly increased to make the flicker hardly perceptible. The vibration concerned represents a relative value between the vibration of the projector itself and the driver's vibration. The driver's vibration is hard to measure. A vibration frequency at his or her head may be used. This vibration frequency is estimated from a seat vibration using a human body model.

In dark mode 2, the projector 4 repeats the pulsed light emission in 60 Hz cycles similarly to dark mode 1. When emitting the light, dark mode 2 allows current (i.e., light emission intensity) I2 at the timing asynchronous with the exposure of the shutter 5a to be smaller than current I at the timing synchronous with the exposure thereof. This can suppress an occurrence of flicker. In addition, dark mode 2 enables the projector 4 to reduce more consumption current than dark mode 1.

When emitting the light, dark mode 3 allows light emission current I3 at the timing asynchronous with the exposure of the shutter 5a to be smaller than current I2 in dark mode 2. Dark mode 3 uses longer light emission time than dark mode 2. This can suppress an occurrence of flicker. In addition, dark mode 3 enables the projector 4 to reduce more consumption current than dark mode 1.

In dark mode 4, the projector 4 repeats the light emission in 30 Hz cycles similarly to the bright mode. Further, dark mode 4 uses longer light emission time than the bright mode while keeping the current value unchanged. This can suppress an occurrence of flicker.

In dark mode 5, the projector 4 repeats the light emission in 30 Hz cycles similarly to the bright mode. After the exposure of the shutter 5a, dark mode 5 keeps the light emission using current I5 different from (e.g., smaller than) current I for the exposure. The light emission continues for a predetermined interval (e.g., shorter than the light emission cycle). This can suppress an occurrence of flicker. In addition, dark mode 5 enables the projector 4 to reduce more consumption current than dark mode 4.

In dark mode 6, the projector 4 steadily emits light regardless of the exposure timing of the shutter 5a. Light emission current I6 is smaller than current value I in the bright mode. This can suppress an occurrence of flicker. In addition, dark mode 6 enables the projector 4 to reduce more consumption current than dark mode 4.

Dark mode 7 combines the bright mode with dark mode 6. After the shutter 5a stops the exposure, the projector 4 steadily emits light using light emission current I7 smaller than current I for the exposure. This can suppress an occurrence of flicker. In addition, dark mode 7 enables the projector 4 to reduce more consumption current than dark mode 4.

Dark modes 1, 2, and 6 are more effective than the others in terms of the corresponding light emission patterns.

Now referring back to FIG. 2, the projector controller 23 controls light emission of the projector 4 based on the settled light emission pattern and image capture timing. The image capture controller 24 controls operation of the image capturing portion 5 to capture an image (S17). The recognition portion 25 recognizes the occupant's face from the image data captured by the image capturing portion 5 (S18). Based on a recognition result, the recognition portion 25 determines whether the control value needs to be changed.

For example, the recognition portion 25 detects as a predetermined face-part region a region equivalent to the skin such as the forehead or cheeks from the captured face image of the occupant. The recognition portion 25 compares a color (filtered pixel value) of the occupants skin with a predetermined reference color already stored in the storage portion 28. Based on a comparison result (e.g., a digitized difference between both colors), the recognition portion 25 determines whether the control value needs to be changed.

If the control value need not be changed (NO at S19), the process increments the value of a delay counter M (S23). The process returns to S17 and repeats the light emission and the image capture using the current control value. If the control value needs to be changed (YES at S19), the process compares the value of the delay counter M with a delay threshold n. If M>n is true (YES at S20), the process sets the delay counter M to 0 (S21). The process returns to S11 and determines the operation mode again.

If M>n is false (NO at S20), the process changes the control value (S22) and increments the value of the delay counter M (S23). The process returns to S17 and performs the light emission and the image capture.

Immediately after the operation mode changes, as described above, the delay threshold n contains n2 smaller than delay threshold n1 for the normal operation that keeps the operation mode unchanged. The operation mode determination portion 21 verifies a change of the operation mode based on a specific time interval. The specific time interval for the operation mode if changed is set to be shorter than that for the operation mode if not changed. The operation mode determination portion 21 can determine whether the operation mode changes temporarily. The operation mode may change due to a change of the illuminance in a relatively short period of time if the vehicle runs under a bridge or behind a building. In such a case, the operation mode before the change can be fast resumed. It is possible to shorten the time during which the occupants face cannot be recognized accurately.

With reference to FIG. 6, the following describes the control value in detail. Camera controls or camera control tables previously stored in the storage portion 28 are referenced to determine control values. The camera control table contains at least one control table (table 1). For example, the "dB" parameter denotes an index number or a digitized difference resulting from a comparison between the color of a captured face image of the occupant and the reference color. The initial value is "0." In this case, the "shutter time" is set to 300 μsec. The "shutter time" is equivalent to the time (exposure time) during which the shutter 5*a* opens. In this case, the "gain" is doubled. The "gain" denotes an amplification factor at which the image capturing portion 5 amplifies captured image data (analog signal). That is, the control value contains the "shutter time" and the "gain."

The control values contain the same "gain" parameter and different "shutter time" parameters. Therefore, the control values are adjustable. Obviously, the control values may contain the same "shutter time" parameter and different "gain" parameters.

The emission intensity is small if the color of the captured face image is darker than the reference color. In this case, the control value is changed to "shutter time" and "gain" corresponding to a "dB" value greater than the current "dB" value based on a difference between both colors, for example. On the other hand, the emission intensity is sufficiently large if the color of the captured face image is brighter than the reference color. In this case, the control value is changed to "shutter time" and "gain" corresponding to a "dB" value smaller than the current "dB" value based on a difference between both colors.

When the operation mode changes, the image capture may use a control value corresponding to the current "dB" value or a control value corresponding to the "dB" value set to "0."

Multiple camera control tables 1 through 3 may be provided. Any one of the tables 1 through 3 may be selected and used in accordance with a result of comparison (color difference) between the color of the captured face image and the reference color. The control value may be determined from the selected table. The camera control table may be provided for each of light emission patterns.

With reference to FIG. 9, the following describes another example of the projector control process according to the present embodiment of the present disclosure. This process is a modification of the process in FIG. 2 described above. The mutually corresponding process steps in FIGS. 9 and 2 are designated by the same reference numerals and a detailed description is omitted for simplicity. S11 through S18 are equal to those in FIG. 2.

At S18, the recognition portion 25 recognizes an occupant's face from the image data captured by the image capturing portion 5. The recognition portion 25 compares the value of the delay counter M with the delay threshold n. If M>n is true (YES at S19*a*), the process sets the delay counter M to 0 (S21). The process returns to S11 and determines the operation mode again.

If M>n is false (NO at S19*a*), the recognition portion 25 determines whether the control value needs to be changed. If the control value need not be changed (NO at S20*a*), the process increments the value of the delay counter M (S23*a*). The process returns to S17 and repeats the light emission and the image capture using the current control value. If the control value needs to be changed (YES at S20*a*), the process changes the control value (S22*a*). The process increments the value of the delay counter M (S23*a*) and then returns to S17 to perform the light emission and the image capture.

While the first aspect of the present disclosure is already recited in the preceding summary, other aspects optional thereto may be set out as follows.

For instance, as a second aspect, the face image detection apparatus may include a recognition portion that recognizes the face of the occupant from image data captured by the image capturing portion and detect a pixel value for a predetermined face-part region in the face of the occupant. Herein, the image capture controller may adjust at least one of an exposure time and a gain of the image capturing portion when the projector emits light using the light emission pattern so that the pixel value for the predetermined face-part region detected by the recognition portion approximates to a predetermined reference value, and reflect the adjusted parameter on the image capturing condition to re-settle a re-settled image capturing condition to capture the predetermined capture region for next image capturing by the image capturing portion. The image capturing portion may perform the next image capturing to capture the predetermined capture region including the face based on the re-settled image capturing condition.

As a third aspect, in cases that a recognition result from the recognition portion indicates that the pixel value for the predetermined face-part region in the face of the occupant is not within a predetermined range from the predetermined reference value, the image capture controller may not re-settle the re-settled image capturing condition to capture the predetermined capture region until a predetermined settlement time interval elapses since the image capturing condition is settled previously. In other words, the image capture controller may re-settle the re-settled image capturing condition to capture the predetermined capture region when a re-settlement condition is satisfied. The re-settlement condition may be a condition that (i) a recognition result from the recognition portion indicates that the pixel value for the predetermined face-part region in the face of the occupant is not within a predetermined range from the predetermined reference value, and, simultaneously, (ii) a predetermined settlement time interval elapses since the image capturing condition is settled previously.

For instance, as long as the recognition result indicates that the pixel value for the predetermined face-part region in the face of the occupant is not within the predetermined range from the predetermined reference value, the image capture controller may primarily re-settle the re-settled image capturing condition repeatedly. In this case, the image capturing condition may change too frequently because the recognition result is fed back. Thereby, the occupant's face may not be recognized correctly. Therefore, when a predetermined settlement time interval elapses, the image capture controller may use the recognition result in the recognition portion, thereby re-settling the image capturing condition (i.e., the re-settled image capturing condition).

As a fourth aspect, the operation mode determination portion may not perform a mode re-determination to re-determine a re-determined operation mode based on a state of environment light detected by the environment light detection portion until a predetermined determination time interval elapses since the operation mode is determined previously. In other words, the operation mode determination portion may perform a mode re-determination to re-determine a re-determined operation mode based on a state of environment light detected by the environment light detection portion when a re-determination condition is satisfied. The determination condition may be a condition that a predetermined determination time interval elapses since the operation mode is determined previously.

Under this configuration, the time and effort which re-determines the operation mode is saved, and the occupant's face can be promptly and correctly recognized. Further, this configuration may be provided to overcome the following issue. That is, the state of environment light may be periodically measured in order to determine the operation mode. The operation mode may change too frequently as a result of the feed-back of the influence of the environment light which changes every moment under the running environment of the vehicle. In addition, if the operation mode changes when the recognized state of the occupant's face is close to the reference state, the subsequent recognized state may be more different from the reference state on the contrary and may not converge on the optimal control for recognizing the occupant's face. Thereby, the occupant's face cannot be recognized correctly.

As a fifth aspect, the operation mode determination portion may perform the mode re-determination to re-determine the re-determined operation mode when the predetermined determination time interval has just elapsed since the operation mode is determined previously, or when a request to re-settle a re-settled image capturing condition occurs after the predetermined time interval elapses since the operation mode is determined previously. In other words, the operation mode determination portion may perform the mode re-determination to re-determine the re-determined operation mode when one of a first condition and a second condition is satisfied. The first condition may be a condition that the predetermined determination time interval has just elapsed since the operation mode is determined previously. The second condition may be a condition that a request to re-settle a re-settled image capturing condition occurs after the predetermined time interval elapses since the operation mode is determined previously.

The above configuration may prevent the re-determination of the operation mode from taking place too frequently, enabling the prompt and correct recognition of the occupant's face.

As a sixth aspect, the light emission pattern setup portion may change the light emission pattern for the light source based on a state of the environment light, which is detected by the environment light detection portion with a predetermined detection time interval, reducing a flicker perceived by the occupant.

This configuration gives priority to the reduction of the flicker instead of the recognition of the occupant's face. Thus, the light emission of the light source (namely, flicker) can be prevented from becoming the hindrance of driving or from worsening the vehicle compartment environment.

As a seventh aspect, when the operation mode is specified as a bright mode that is equal to the first mode where the light intensity of the environment light detected by the environment light detection portion is greater than the predetermined light intensity threshold, the light emission pattern setup portion may settle the light emission pattern to include an exposure-synchronous emission that is equivalent to a pulse light emission being synchronous with an exposure time interval of the image capturing portion.

There is a great amount of environment light in the state where the landscape or scenery is reflected on the glasses. Thus, even if the pulse light emission of the projector (namely, light source) is carried out and the amount of the light emission is increased, the driver hardly perceives the flicker. Thus, the above configuration can increase the amount of the light emission against the amount of the environment light (i.e., increasing S/N ratio) in the bright mode while suppressing the generation of the flicker. Thereby, the correct recognition of the occupant's face is enabled.

As an eighth example, when the operation mode is specified as a dark mode that is equal to the second mode where the light intensity of the environment light detected by the environment light detection portion is not greater than the predetermined light intensity threshold, the light emission pattern setup portion may settle the light emission pattern to include an exposure-synchronous emission and an exposure-asynchronous emission. The exposure-synchronous emission is a pulse light emission that is synchronous with an exposure time interval of the image capturing portion. The exposure-asynchronous emission is a light emission pattern that is asynchronous with the exposure time interval of the image capturing portion.

This configuration may increase the repetition times (i.e., frequency) of the pulse emission in the dark mode, thereby reducing the flicker perceived by the occupant.

As a ninth example, the light emission pattern setup portion may settle the light emission pattern in the exposure-asynchronous emission as a pulse light emission.

The light emission pattern in the exposure-asynchronous emission is settled as a pulse light emission; thus, the frequency of the pulse becomes higher seemingly. While the flicker of the light source is suppressed, the sufficient light amount may be obtained at the image capturing under the exposure-synchronous emission. Thereby, the correct recognition of the occupant's face is enabled. It is noted that when the environment light is weak, the landscape or scenery is hardly reflected on the glasses. Further, an exposure-asynchronous emission is performed; thereby, the projector needs to perform an unnecessary light emission. If the light source is considered to be used within the rated current, the light amount in the exposure-synchronous emission needs to be set to the relatively low value as compared with that in the bright mode. However, in the dark mode, primarily, there is little environment light; thus, the S/N is kept high enough.

As a tenth aspect, the light emission pattern setup portion may settle the light emission pattern in the exposure-asynchronous emission as a steady light emission.

This configuration can suppress the flicker of the light source by causing the projector to perform a steady light emission. Further, the exposure time may be lengthened; thus, the sufficient light amount is securable at the image capturing. Thereby, the correct recognition of the occupant's face is enabled. Further, the steady light emission requires the projector to perform a useless light emission during the time other than the exposure time. If the light source is considered to be used within the rated current, the amount of the light emission needs to be set to the relatively low. However, in the dark mode, primarily, there is little environment light; thus, the S/N is kept high enough. Lengthening the exposure time does not provide an disadvantage.

As an eleventh aspect, the light emission pattern setup portion may use an independent value for a current applied to the light source in accordance with each of the exposure-synchronous emission and the exposure-asynchronous emission.

This configuration increases the frequency of the light emission seemingly. While the flicker of the light source is suppressed, the sufficient light amount is securable at the image capturing. Thereby the correct recognition of the occupant's face is enabled. Furthermore, the above configuration decreases a current applied at the exposure-asynchronous emission, thereby reducing the consumed electric current of the light source.

As a twelfth aspect, light emitted from the light source may include a near-infrared wavelength.

This configuration can be achieved by using a conventional face image detection apparatus that captures an image of a driver's face using an infrared stroboscope or LED having a near-infrared wavelength zone without need to change the conventional apparatus to a great extent.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A face image capturing apparatus comprising:
   a projector that projects light onto a projection region including a face of an occupant in a vehicle;
   an image capture controller that settles an image capturing condition to capture a predetermined capture region that includes the face of the occupant;
   an image capturing portion that performs image capturing to capture the predetermined capture region including the face based on the image capturing condition settled by the image capture controller;
   an environment light detection portion that detects environment light radiated to the vehicle or the occupant;
   an operation mode determination portion that performs a mode determination to determine an operation mode from a first and a second operation mode, the first operation mode taking place when a light intensity of the environment light detected by the environment light detection portion is greater than a predetermined light intensity threshold, the second operation mode taking place when the light intensity of the environment light detected by the environment light detection portion is not greater than the predetermined light intensity threshold;
   a light emission pattern setup portion that settles a light emission pattern for a light source of the projector based on the operation mode determined by the operation mode determination portion; and
   a projector controller that controls the projector to activate the light source based on the light emission pattern settled by the light emission pattern setup portion;
   wherein
   when the operation mode is specified as the second operation mode taking place when the light intensity of the environment light detected by the environment light detection portion is not greater than the predetermined light intensity threshold, the light emission pattern setup portion settles the light emission pattern to include an exposure-synchronous emission and an exposure-asynchronous emission,
      the exposure-synchronous emission being a pulse light emission that is synchronous with an exposure time interval of the image capturing portion,
      the exposure-asynchronous emission being a light emission pattern that is asynchronous with the exposure time interval of the image capturing portion.

2. The face image capturing apparatus according to claim 1, comprising:
   a recognition portion that recognizes the face of the occupant from image data captured by the image capturing portion and detects a pixel value for a predetermined face-part region in the face of the occupant,
   wherein:
   the image capture controller
      adjusts at least one of an exposure time or a gain of the image capturing portion when the projector emits light using the light emission pattern so that the pixel value for the predetermined face-part region detected by the recognition portion approximates to a predetermined reference value, and
      reflects the adjusted parameter on the image capturing condition to re-settle a re-settled image capturing condition to capture the predetermined capture region for next image capturing by the image capturing portion; and
   the image capturing portion performs the next image capturing to capture the predetermined capture region including the face based on the re-settled image capturing condition.

3. The face image capturing apparatus according to claim 2, wherein:
   in cases that a recognition result from the recognition portion indicates that the pixel value for the predetermined face-part region in the face of the occupant is not within a predetermined range from the predetermined reference value,
   the image capture controller does not re-settle the re-settled image capturing condition to capture the predetermined capture region until a predetermined settlement time interval elapses since the image capturing condition is settled previously.

4. The face image capturing apparatus according to claim 1,
wherein the operation mode determination portion does not perform a mode re-determination to re-determine a re-determined operation mode based on a state of environment light detected by the environment light detection portion until a predetermined determination time interval elapses since the operation mode is determined previously.

5. The face image capturing apparatus according to claim 4,
wherein the operation mode determination portion performs the mode re-determination to re-determine the re-determined operation mode when the predetermined determination time interval has just elapsed since the operation mode is determined previously, or when a request to re-settle a re-settled image capturing condition occurs after the predetermined time interval elapses since the operation mode is determined previously.

6. The face image capturing apparatus according to claim 1,
wherein the light emission pattern setup portion changes the light emission pattern for the light source based on a state of the environment light, which is detected by the environment light detection portion with a predetermined detection time interval, reducing a flicker perceived by the occupant.

7. The face image capturing apparatus according to claim 1,
wherein, when the operation mode is specified as first operation mode taking place when the light intensity of the environment light detected by the environment light detection portion is greater than the predetermined light intensity threshold, the light emission pattern setup portion settles the light emission pattern to include the exposure-synchronous emission.

8. The face image capturing apparatus according to claim 1,
wherein the light emission pattern setup portion settles the light emission pattern in the exposure-asynchronous emission as a pulse light emission.

9. The face image capturing apparatus according to claim 1,
wherein the light emission pattern setup portion settles the light emission pattern in the exposure-asynchronous emission as a steady light emission.

10. The face image capturing apparatus according to claim 1,
wherein the light emission pattern setup portion uses an independent value for a current applied to the light source in accordance with each of the exposure-synchronous emission and the exposure-asynchronous emission.

11. The face image capturing apparatus according to claim 1,
wherein light emitted from the light source includes a near-infrared wavelength.

* * * * *